(12) United States Patent
Liu

(10) Patent No.: US 9,696,466 B2
(45) Date of Patent: Jul. 4, 2017

(54) BLACK EDGE PRISM SHEET, METHOD FOR MANUFACTURING THE PRISM SHEET, MANUFACTURING EQUIPMENT AND DISPLAY DEVICE

(71) Applicants: BOE TECHNOLOGY GROUP CO., LTD., Beijing (CN); HEFEI BOE DISPLAY LIGHT CO., LTD., HeFei, Anhui (CN)

(72) Inventor: Gang Liu, Beijing (CN)

(73) Assignees: BOE TECHNOLOGY GROUP CO., LTD., Beijing (CN); HEFEI BOE DISPLAY LIGHT CO., LTD., Hefei, Anhui (CN)

( * ) Notice: Subject to any disclaimer, the term of this patent is extended or adjusted under 35 U.S.C. 154(b) by 76 days.

(21) Appl. No.: 14/469,552

(22) Filed: Aug. 26, 2014

(65) Prior Publication Data
US 2015/0369973 A1    Dec. 24, 2015

(30) Foreign Application Priority Data

Jun. 20, 2014  (CN) .......................... 2014 1 0280238

(51) Int. Cl.
*G02B 5/04* (2006.01)
*B29D 11/00* (2006.01)
(Continued)

(52) U.S. Cl.
CPC .......... *G02B 5/045* (2013.01); *B29D 11/0074* (2013.01); *G02B 5/0231* (2013.01); *B29K 2105/0097* (2013.01)

(58) Field of Classification Search
CPC ... G02B 5/045; G02B 5/0231; B29D 11/0074
(Continued)

(56) References Cited

U.S. PATENT DOCUMENTS 4,714,983 A * 12/1987 Lang .................... G02B 6/0021
349/65
5,771,328 A * 6/1998 Wortman .................. F21V 5/02
349/62
(Continued)

FOREIGN PATENT DOCUMENTS

CN          1756643        4/2006
CN         101008735       8/2007
(Continued)

OTHER PUBLICATIONS

Chinese Office Action with English Language Translation, dated May 30, 2016, Chinese Application No. 201410280238.4.
(Continued)

*Primary Examiner* — Ricky D Shafer
(74) *Attorney, Agent, or Firm* — Blakely Sokoloff Taylor & Zafman LLP

(57) ABSTRACT

A black edge prism sheet is disclosed, having a substrate and a shadowless glue film layer molded on one side of the substrate. The shadowless glue film layer includes: a central region having multiple first geometry structures arranged in parallel to each other, forming a surface of prisms, and a peripheral region. The peripheral region has multiple second geometry structures arranged adjacent to each other. The peripheral region is located outside the central region and extends to edge of the shadowless glue film layer. An ink layer is printed on the multiple second geometry structures.

13 Claims, 2 Drawing Sheets

(51) Int. Cl.
*G02B 5/02* (2006.01)
*B29K 105/00* (2006.01)

(58) Field of Classification Search
USPC ......... 359/831, 837, 599, 900; 362/620, 626
See application file for complete search history.

(56) References Cited

U.S. PATENT DOCUMENTS

| | | | | |
|---|---|---|---|---|
| 5,788,356 | A * | 8/1998 | Watai | G02B 6/0031 |
| | | | | 362/23.15 |
| 6,074,070 | A * | 6/2000 | Sasako | G02B 6/0055 |
| | | | | 362/301 |
| 7,245,427 | B2 * | 7/2007 | Sekiguchi | G03B 21/625 |
| | | | | 359/443 |
| 9,207,386 | B2 * | 12/2015 | Kim | G02B 6/0053 |
| 2006/0291242 | A1 * | 12/2006 | Ko | G02F 1/133608 |
| | | | | 362/607 |
| 2012/0002437 | A1 * | 1/2012 | Yabe | G02B 6/0028 |
| | | | | 362/606 |
| 2014/0293152 | A1 * | 10/2014 | Gao | G06F 3/044 |
| | | | | 349/12 |

FOREIGN PATENT DOCUMENTS

| | | |
|---|---|---|
| CN | 101738648 | 6/2010 |
| CN | 201597238 | 10/2010 |
| CN | 102759772 | 10/2012 |
| JP | H10300904 | 11/1998 |

OTHER PUBLICATIONS

Chinese Office Action with English Language Translation, dated Nov. 26, 2015, Chinese Application No. 2014102802384.
Decision on Rejection in Chinese Application No. 201410280238.4 dated Sep. 26, 2016, with English translation. 12 pages.

* cited by examiner

BLACK EDGE PRISM SHEET, METHOD FOR MANUFACTURING THE PRISM SHEET, MANUFACTURING EQUIPMENT AND DISPLAY DEVICE

FIELD OF THE INVENTION

The present disclosure relates to the field of manufacturing prism sheet, in particular, it relates to a black edge prism sheet, a method for manufacturing the prism sheet, a manufacturing equipment and a display device.

BACKGROUND OF THE INVENTION

At present, tablets, laptops and other display equipments develop toward lightweight and thin. For the backlight module of display devices with small screen (below 10.1 inches), membrane material architecture without upper diffusion sheet is used to meet market demand. The periphery of the upper diffusion sheet has a printed black edge structure, which can be effectively used for avoiding light-leaking situation on the edge of the prism. When using architecture without upper diffusion sheet, in order to avoid light-leaking phenomenon on the edge, a black shading tape with a shape of a rectangle frame is typically attached on the periphery of the prism sheet to form a black peripheral zone.

Currently, the approach of attaching black shading tape with a shape of a rectangle frame has the following defects: (1) attaching the shading tape is difficult, long time consuming, with a low production rate. The scrappage of the upper prism sheet and the shading tape is large; the cost of the backlight module is high; (2) the shading tape with a shape of a rectangle frame is formed by hollowing the center part of the shading tape sheet, which will cause a large amount of waste and a high cost of materials; (3) the independent set shading tape occupies a certain thickness, increasing the thickness of the backlight module, which is contrary to the current trend of thinness.

SUMMARY OF THE INVENTION

Technical Problem to be Solved

The present disclosure provides a black edge prism sheet manufactured by printing and a display module applying the black edge prism sheet. The black edge prism sheet does not need to be attached with shading tape, contributing to improve work efficiency and reduce production costs and the thickness of the backlight module. In addition, the present disclosure further provides a method for manufacturing the prism sheet and a manufacturing equipment.

Technical Solutions

To solve the above mentioned technical problem, the present disclosure provides a black edge prism sheet, the black edge prism sheet comprises a substrate and a shadowless glue film layer molded on one side of the substrate; the shadowless glue film layer comprises:

a central region, the central region has multiple first geometry structures arranged in parallel to each other; and a peripheral region, the peripheral region has multiple second geometry structures arranged adjacent to each other; the peripheral region is located outside the central region and extends to edge of the shadowless glue film layer; an ink layer is printed on the peripheral region.

Advantageously, the first geometry structures are sawtooth structures.

Advantageously, the second geometry structures are bump particles or pit structures.

Advantageously, density of the second geometry structures on the peripheral region is larger than $900/cm^2$.

Advantageously, the substrate is made of thermoplastic material.

Advantageously, the thermoplastic material is polyethylene terephthalate, polycarbonate, or polystyrene.

Advantageously, the first geometry structures and the second geometry structures are molded integrally with mould or stamping molded on the shadowless glue film layer.

The present disclosure also provides a display device, wherein the abovementioned black edge prism sheet is applied in a backlight module of the display device.

The present disclosure further provides a method for manufacturing a black edge prism sheet, wherein the method comprises:

S1: coating shadowless glue on one side of a substrate to be processed to form a shadowless glue film layer;

S2: impressing on the shadowless glue film layer with a hot pressing roller to form a prism sheet unit comprising a central region and a peripheral region; the central region has multiple first geometry structures arranged in parallel to each other; the peripheral region has multiple second geometry structures arranged adjacent to each other;

S3: irradiating the shadowless glue film layer with an ultraviolet lamp to cure the shadowless glue film layer; and S4: printing an ink layer on the peripheral region of the prism sheet unit.

Advantageously, the method further comprises:

S5: segmenting the prism sheet unit along the outer edge of the peripheral region, as a black edge prism sheet.

Advantageously, the step of S4 comprises:

S41: attaching a protective film on the central region of the prism sheet unit; and S42: printing an ink layer on the overall prism sheet unit; tearing off the protective film when the ink is dry.

Advantageously, the hot pressing roller is irradiated with laser or chemical etched to form a pressing film unit, which pressing film unit is used for impressing to form the prism sheet unit.

Advantageously, multiple pressing film units are formed along the axial direction of the hot pressing roller.

Advantageously, the substrate is made of thermoplastic material; the thermoplastic material is polyethylene terephthalate, polycarbonate, or polystyrene.

The present disclosure further provides a manufacturing equipment for manufacturing a prism sheet, wherein the manufacturing equipment comprises:

a substrate releasing roller, the substrate releasing roller is configured for placing a film roll of a substrate to be processed, and releasing the substrate to be processed;

a coating machine, the coating machine is installed downstream the substrate releasing roller, and configured for coating shadowless glue film on the substrate to be processed to form a shadowless glue film layer;

a hot pressing roller, the hot pressing roller is installed downstream the coating machine; at least one pressing film unit is arranged on the hot pressing roller, the pressing film unit comprising:

a central region, the central region has multiple first geometry structures arranged in parallel to each other; and a peripheral region, the peripheral region has multiple second geometry structures arranged adjacent to each other;

the hot pressing roller is configured for impressing the shadowless glue film layer, and forming a prism sheet unit accordingly, which prism sheet unit comprises a central region and a peripheral region;

an ultraviolet lamp, the ultraviolet lamp is installed downstream the hot pressing roller, and configured for curing the shadowless glue film layer;

a film attaching roller, the film attaching roller is installed downstream the ultraviolet lamp, and configured for attaching a protective film;

a printing roller, the printing roller is installed downstream the film attaching roller, and configured for printing an ink layer on the shadowless glue film layer; and a drying cabinet, the drying cabinet is installed downstream the printing roller, and configured for drying the ink layer.

Advantageous Effects

The black edge prism sheet of the present disclosure integrates a black shading surface with a prism surface, without attaching shading tape on the periphery of the prism surface; thus the production efficiency and product qualification rate are improved. Without using a shading tape, the production cost can be reduced, and the thickness of the backlight module can also be reduced effectively (typically, 0.07 mm~1.5 mm can be reduced). The width of the shading surface can be controlled well: narrower black shading surface can be printed by means of the printed black edge prism sheet, which is particularly suitable for the display device with an ultra-narrow bezel. Moreover, the present disclosure also provides a method for manufacturing the prism sheet, which can improve the production efficiency and reduce the production cost.

The reference numbers in the accompanying drawings respectively refer to:

1: shadowless glue film layer; 2: substrate; 10: black edge prism sheet; 11: central region; 12: peripheral region; 13: ink layer; 20: diffusion sheet; 30: light guide plate; 40: reflective sheet; 50: glue frame; 60: lamp unit; 70: reflex housing; 80: backboard; 111: first geometry structures; 121: second geometry structures; 100: substrate releasing roller; 101: substrate to be processed; 200: coating machine; 300: hot pressing roller; 400: ultraviolet lamp; 500: film attaching roller; 600: printing roller; 700: drying cabinet.

DETAILED DESCRIPTION OF THE INVENTION

Reference will now be made to embodiments of the disclosure, one or more examples of which are illustrated in the figures. The embodiments are provided by way of explanation of the disclosure, and are not meant as a limitation of the disclosure.

Figure 1:
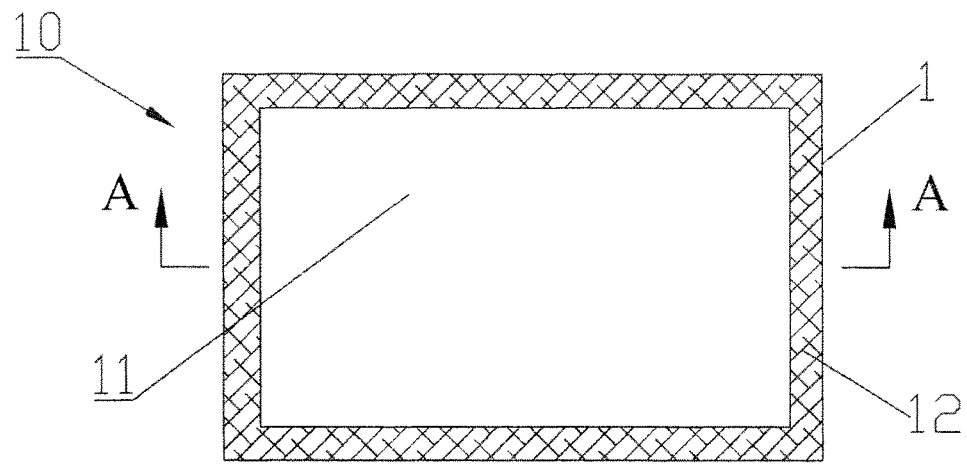
FIG. 1 is a front view of an embodiment according to the black edge prism sheet of the present disclosure.
Figure 2:
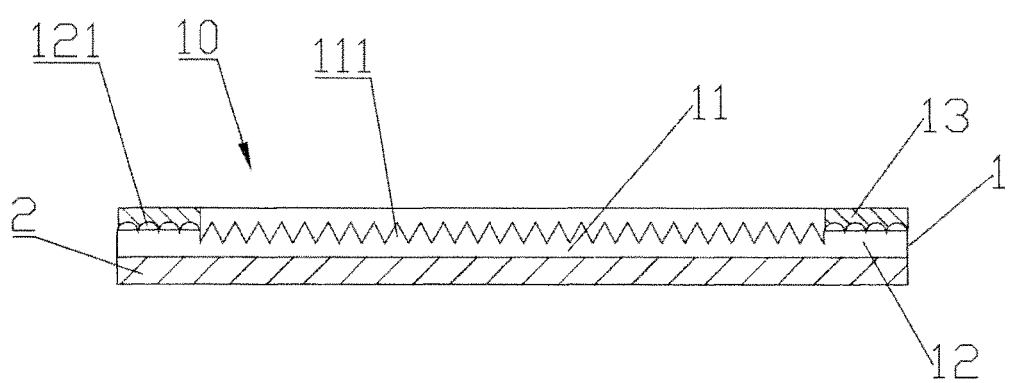
FIG. 2 is a sectional view taken along A-A in FIG. 1.

As shown in FIG. 1 and FIG. 2, the black edge prism sheet 10 of the present disclosure comprises a substrate 2 and a shadowless glue film layer 1 molded on one side of the substrate 2. The substrate 2 can be made of thermoplastic material, such as polyethylene terephthalate, polycarbonate, or polystyrene. The shadowless glue film layer 1 comprises a central region 11 and a peripheral region 12. UV glue can be used to form the shadowless glue film layer 1. Typically, the central region 11 is a rectangular region. The size of the rectangular central region can be 7 inches to 14 inches. The size can be selected according to the requirements. The peripheral region 12 is located outside the central region 11 and extends to edge of the shadowless glue film layer 1. The peripheral region 12 has a structure of rectangle frame. The upper surface of the central region 11 has multiple first geometry structures 111, which are sawtooth structures or prismatic cylindrical structures. The first geometry structures 111 are arranged parallelly or in the form of an array, forming a surface of prisms. The upper surface of the peripheral region 12 has multiple second geometry structures 121. The second geometry structures 121 are arranged adjacent to each other on the peripheral region 12, forming a rough surface, such that the ink can be printed on the peripheral region 12 uniformly. It is thus possible to print a black edge on the peripheral region of the prism sheet. Advantageously, the central region 11 and the peripheral region 12 have the same height. An ink layer 13 is printed on the peripheral region to form a black shading surface. Advantageously, in an embodiment of the disclosure, the second geometry structures 121 are bump particles on the peripheral region 12. The second geometry structures 121 are arranged on the peripheral region 12, such that the peripheral region 12 becomes a rough surface structure. In order to ensure that the ink can be attached onto the peripheral region 12 steadily, the density of the second geometry structures 121 on the peripheral region 12 is larger than 900/cm$^2$. The ink used in this embodiment can be the UV-curable printing inks used in diffusion sheet printing field.

Further, the first geometry structures 111 and the second geometry structures 121 can be molded integrally with mould or stamping molded on the shadowless glue film layer.

It should be noted that, the second geometry structures 121 of the present disclosure can also be pit structures. The pit structures can be arranged on the peripheral region 12 adjacent to each other, forming a rough surface for coating the ink layer.

The black edge prism sheet of the present disclosure integrates a black shading surface with a prism surface, without attaching shading tape on the periphery of the prism surface; thus the production efficiency and product qualification rate are improved. Without using a shading tape, the production cost can be reduced, and the thickness of the backlight module can also be reduced effectively (typically, 0.07 mm~1.5 mm can be reduced). The width of the shading surface can be controlled well: narrower black shading surface can be printed by means of the printed black edge prism sheet, which is suitable for the display screen with an ultra-narrow bezel.

Figure 3:
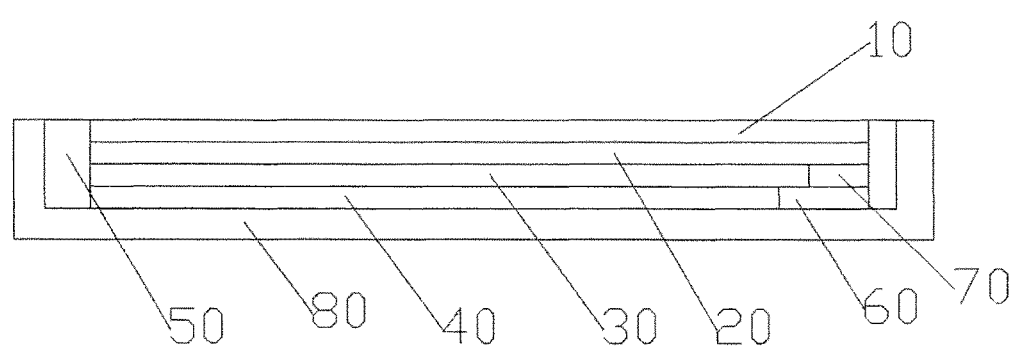
FIG. 3 is a schematic diagram of a backlight module of a laptop.

The present disclosure also provides a display device, wherein the abovementioned black edge prism sheet 10 is applied in a backlight module of the display device. As shown in FIG. 3, in an example of a backlight module of a laptop, the backlight module comprises a backboard 80, a reflex housing 70, a lamp unit 60, a glue frame 50, a reflective sheet 40, a light guide plate 30, a diffusion sheet 20, and a black edge prism sheet 10. Due to the diffusion of the diffusion sheet 20, the light emitted from the diffusion sheet 20 has a bad directionality. A black edge prism sheet 10 is thus attached over the diffusion sheet 20. The central region 11 of the black edge prism sheet 10 is a surface of prisms, which can extract light and improve the display luminance effectively. The peripheral region of the black edge prism sheet 10 is a black edge shading surface, which can avoid light-leaking.

Figure 4:
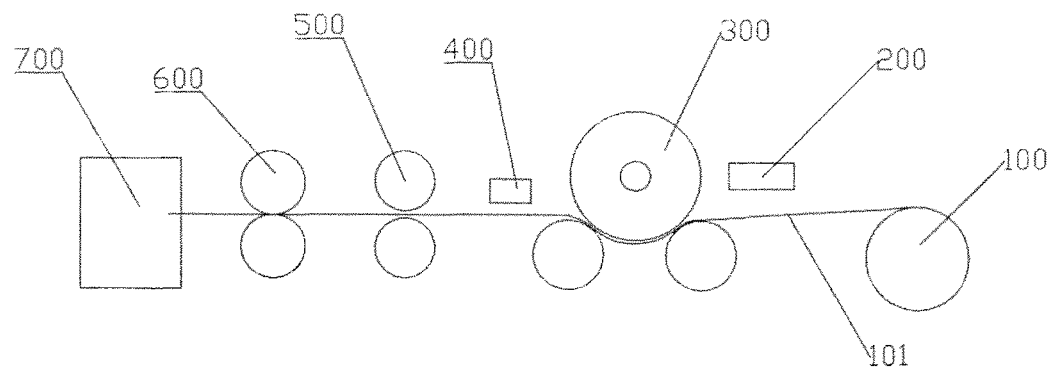
FIG. 4 is a schematic diagram of an embodiment according to the manufacturing equipment of the present disclosure.
Figure 5:
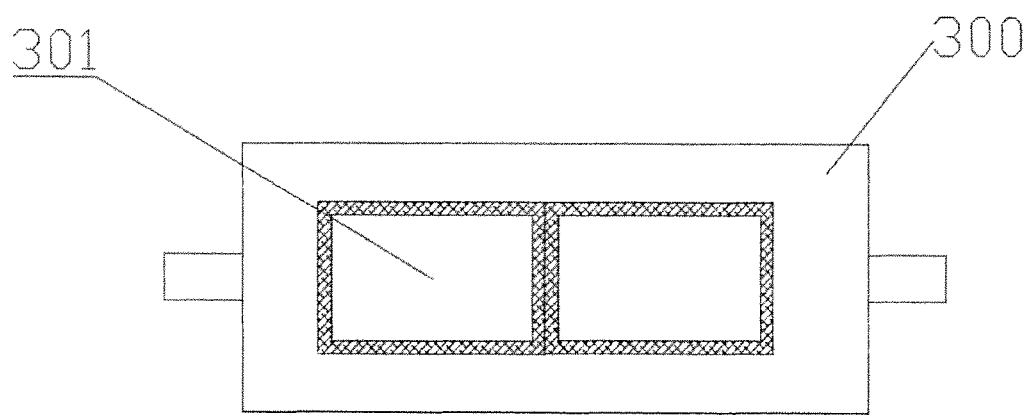
FIG. 5 is a schematic diagram of a hot pressing roller of an embodiment according to the manufacturing equipment of the present disclosure.

As shown in FIG. 4 and FIG. 5, the present disclosure further provides a manufacturing equipment for manufacturing a prism sheet, wherein the manufacturing equipment comprises a substrate releasing roller 100, a coating machine 200, a hot pressing roller 300, an ultraviolet lamp 400, a film attaching roller 500, a printing roller 600, and a drying cabinet 700. The substrate releasing roller 100 is configured for placing a film roll of a substrate to be processed, and releasing the substrate to be processed 101. The coating machine 200 is installed downstream the substrate releasing roller 100, and configured for coating shadowless glue film on the substrate to be processed 101 to form a shadowless glue film layer on the substrate to be processed 101. The hot pressing roller 300 is installed downstream the coating machine 200. Referring to FIG. 5, at least one pressing film unit 301 is arranged on the hot pressing roller 300. The pressing film unit 301 comprises a central region and a peripheral region; the central region has multiple first geometry structures arranged in parallel to each other; the peripheral region has multiple second geometry structures arranged adjacent to each other. The hot pressing roller 300 is configured for impressing the shadowless glue film layer; the pressing film unit 301 is impressed on the shadowless glue film layer, forming a prism sheet unit accordingly, which prism sheet unit comprises a central region and a peripheral region. The ultraviolet lamp 400 is installed downstream the hot pressing roller 300, and configured for curing the shadowless glue film layer. The film attaching roller 500 is installed downstream the ultraviolet lamp 400, and configured for attaching a protective film on the central region of the prism sheet unit. The printing roller 600 is installed downstream the film attaching roller 500, and configured for printing an ink layer on the shadowless glue film layer. The drying cabinet 700 is installed downstream the printing roller 600, and configured for drying the ink layer. If UV-curable printing ink is used, an UV lamp can be installed in the drying cabinet 700 for drying the ink layer.

Figure 6:
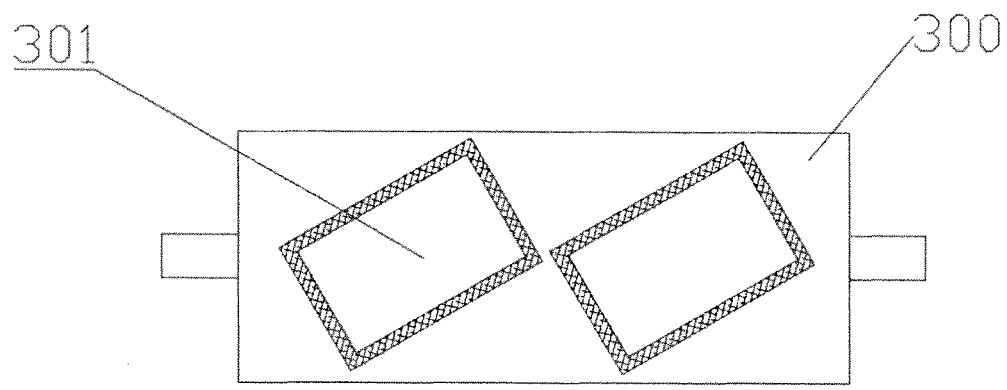
FIG. 6 is a schematic diagram of a hot pressing roller of another embodiment according to the manufacturing equipment of the present disclosure.

Furthermore, referring to FIG. 6, which illustrates that in another embodiment of the manufacturing equipment for manufacturing a prism sheet, the angle of the pressing film unit 301 can be adjusted according to the requirements, i.e., there is an included angle between the edge of the pressing film unit 301 and the axis of the hot pressing roller 300.

Besides, multiple pressing film units 301 can be formed along the axial direction of the hot pressing roller 300. Accordingly, the film attaching roller 500 provides multiple protective films corresponding to the multiple pressing film units 301. With such a hot pressing roller 300, a plurality of prism sheet units can be impressed on the shadowless glue film layer each time; and the film attaching roller 500 attaches multiple protective films on the multiple pressing film units. Hence, a plurality of prism sheet can be produced each time, improving the production efficiency.

The present disclosure also provides a method for manufacturing a black edge prism sheet, wherein the method comprises:

Step S1: coating shadowless glue on one side of a substrate to be processed 101 to form a shadowless glue film layer. As shown in FIG. 4, the substrate releasing roller 100 releases the substrate to be processed 101, and the substrate 101 moves towards the downstream coating machine 200. The substrate 101 can be made of thermoplastic material; the thermoplastic material can be polyethylene terephthalate, polycarbonate, or polystyrene. During the moving of the substrate 101, the coating machine 200 installed downstream the substrate releasing roller 100 coats shadowless glue film on the substrate to be processed 101 to form a shadowless glue film layer.

Step S2: impressing on the shadowless glue film layer with a hot pressing roller 300 to form a prism sheet unit comprising a central region and a peripheral region; the central region has multiple first geometry structures arranged in parallel to each other; the peripheral region has multiple second geometry structures arranged adjacent to each other. The surface of the hot pressing roller 300 is irradiated with laser or chemical etched to form at least one pressing film unit 301, which pressing film unit 301 comprises a central region 11 and a peripheral region 12. Each pressing film unit 301 can be used for impressing the shadowless glue film layer to form a prism sheet unit. The hot pressing roller 300 can be provided with multiple pressing film units 301. The multiple pressing film units 301 can be formed along the axial direction of the hot pressing roller 300. Therefore, each time a plurality of prism sheet units can be impressed on the width direction of the substrate to be processed 101.

Step S3: irradiating the shadowless glue film layer with an ultraviolet lamp 400 to cure the shadowless glue film layer.

Step S4: printing an ink layer on the peripheral region of the prism sheet unit to form a black edge shading surface. Wherein the step of S4 can comprise: step S41, attaching a protective film on the central region of the prism sheet unit with a film attaching roller 500; step S42, printing an ink layer on the overall prism sheet unit with a printing roller 600, drying the ink layer with a drying cabinet 70, tearing off the protective film for use when the ink is dry. Due to the function of the protective film, the prism structure on the central region can be protected, and the central region will not be coated with ink layer, therefore, the region of the prism structure can be used normally to emit light. The peripheral region is coated with ink layer, thus the phenomenon of light-leaking can be avoided effectively.

Step S5: segmenting the prism sheet unit along the outer edge of the peripheral region, each prism sheet unit can be used as a black edge prism sheet.

With the above mentioned method for manufacturing a prism sheet, a black edge prism sheet can be produced quickly and efficiently, the cost of production can be reduced.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A black edge prism sheet, comprising a substrate and a shadowless glue film layer molded on one side of the substrate; the shadowless glue film layer comprising:
    a central region having multiple first geometry structures arranged in parallel to each other, forming a surface of prisms; and
    a peripheral region having multiple second geometry structures arranged adjacent to each other; the peripheral region being located outside the central region and extending to edge of the shadowless glue film layer; an ink layer being printed on the multiple second geometry structures.

2. The black edge prism sheet of claim 1, wherein the first geometry structures are sawtooth structures.

3. The black edge prism sheet of claim 1, wherein the second geometry structures are bump particles or pit structures.

4. The black edge prism sheet of claim 3, wherein density of the second geometry structures on the peripheral region is larger than $900/cm^2$.

5. The black edge prism sheet of claim 1, wherein the substrate is made of thermoplastic material; the thermoplastic material is polyethylene terephthalate, polycarbonate, or polystyrene.

6. The black edge prism sheet of claim 1, wherein the first geometry structures and the second geometry structures are molded integrally with mould or stamping molded on the shadowless glue film layer.

7. A display device, comprising a backlight module applying the black edge prism sheet of claim 1.

8. A method for manufacturing the black edge prism sheet of claim 1, wherein the method comprises:
    coating shadowless glue on one side of the substrate to be processed to form the shadowless glue film layer;
    impressing on the shadowless glue film layer with a hot pressing roller to form the prism sheet unit comprising the central region and the peripheral region; the central region has the multiple first geometry structures arranged in parallel to each other; the peripheral region has the multiple second geometry structures arranged adjacent to each other;
    irradiating the shadowless glue film layer with an ultraviolet lamp to cure the shadowless glue film layer; and
    printing the ink layer on the peripheral region of the prism sheet unit.

9. The method according to claim 8, wherein the method further comprises:
    segmenting the prism sheet unit along an outer edge of the peripheral region, as the black edge prism sheet.

10. The method according to claim 8, wherein the printing step comprises:
    attaching a protective film on the central region of the prism sheet unit; and
    printing the ink layer on the overall prism sheet unit;
    tearing off the protective film when the ink is dry.

11. The method according to claim 8, wherein the hot pressing roller is irradiated with laser or chemical etched to form a pressing film unit, the pressing film unit is used for impressing to form the prism sheet unit.

12. The method according to claim 11, wherein multiple pressing film units are formed along an axial direction of the hot pressing roller.

13. The method according to claim 8, wherein the substrate is made of thermoplastic material; the thermoplastic material is polyethylene terephthalate, polycarbonate, or polystyrene.

* * * * *